United States Patent
Xu et al.

(10) Patent No.: US 11,500,802 B1
(45) Date of Patent: Nov. 15, 2022

(54) DATA REPLICATION FOR ACCELERATOR

(71) Applicant: Amazon Technologies, Inc., Seattle, WA (US)

(72) Inventors: Kun Xu, Austin, TX (US); Ron Diamant, Santa Clara, CA (US); Patricio Kaplan, Palo Alto, CA (US); Henry Wang, San Bruno, CA (US)

(73) Assignee: Amazon Technologies. Inc., Seattle, WA (US)

( * ) Notice: Subject to any disclaimer, the term of this patent is extended or adjusted under 35 U.S.C. 154(b) by 45 days.

(21) Appl. No.: 17/301,344

(22) Filed: Mar. 31, 2021

(51) Int. Cl.
  *G06F 13/28* (2006.01)
  *G06F 15/80* (2006.01)
  *G06F 15/173* (2006.01)

(52) U.S. Cl.
  CPC ........ *G06F 13/28* (2013.01); *G06F 15/17318* (2013.01); *G06F 15/8046* (2013.01)

(58) Field of Classification Search
  CPC . G06F 13/28; G06F 15/17318; G06F 15/8046
  See application file for complete search history.

(56) References Cited

U.S. PATENT DOCUMENTS

2011/0125936 A1* 5/2011 Malleth ................... G06F 13/28
                                                          710/26
2022/0092408 A1* 3/2022 Khaitan .................. G06F 13/28

* cited by examiner

*Primary Examiner* — Idriss N Alrobaye
*Assistant Examiner* — Ronald T Modo
(74) *Attorney, Agent, or Firm* — Weaver Austin Villeneuve & Sampson LLP

(57) ABSTRACT

A direct memory access (DMA) engine can be used to multicast data from system memory to a target memory for loading into an array. The DMA engine may include a controller that is configured to receive a data transfer request, and generate a set of write operations for the output interface. The set of write operations can include, for each of multiple partitions of the target memory, a write operation to write usable data from the multicast data to an address offset in the corresponding partition, and an additional write operation to write filler data from the multicast data to a null device address.

20 Claims, 11 Drawing Sheets

DATA REPLICATION FOR ACCELERATOR

BACKGROUND

Neural networks can be trained using machine learning techniques to perform a certain computing task for an application. The trained neural network can then perform the computing task, for example, to generate an inference from input data. Computing tasks that neural networks can perform may include human-like functions such as visual and audial perception, natural language processing, etc.

BRIEF DESCRIPTION OF THE DRAWINGS

Various embodiments in accordance with the present disclosure will be described with reference to the drawings, in which.

DETAILED DESCRIPTION

Figure 1:
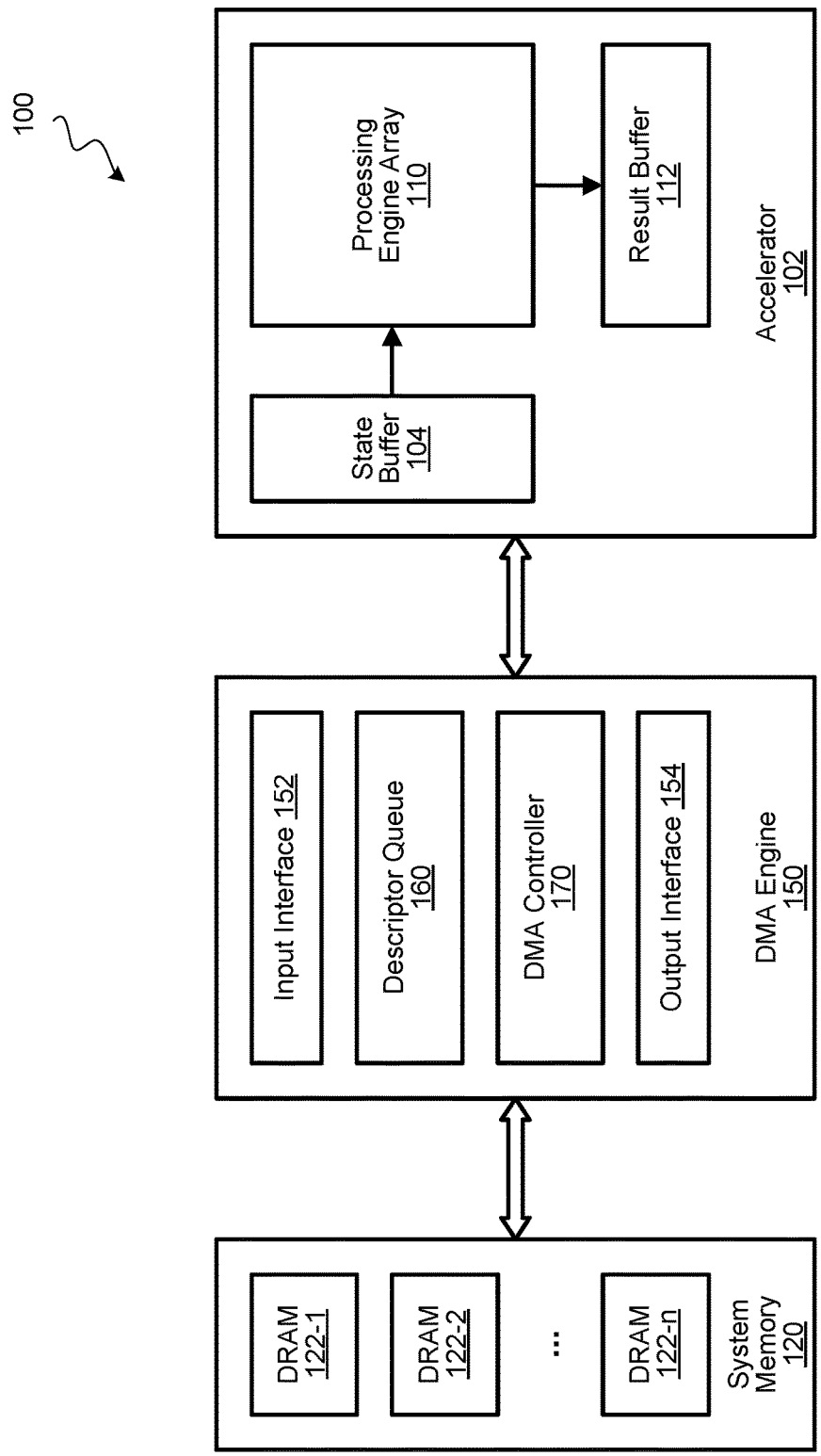
FIG. 1 illustrates a block diagram of an example of a computing system.

Although general-purpose processors can be used to execute neural networks, special-purpose integrated circuit devices can be designed to execute neural networks at a significantly higher efficiency than these processors. Such devices (which may be referred to as accelerators) can have unique hardware features that allow the most-encountered operations of a neural network to be performed seamlessly, often in parallel with other operations of the neural network. For example, an accelerator may include dedicated circuitry to perform matrix multiplication operations, which are often used in neural networks. Such dedicated circuitry can be implemented using an array of processing engines (which may be referred to as a systolic array), where each processing engine (PE) contains circuitry to perform multiplication and accumulation operations to implement a matrix multiplication computation.

In a systolic array, two types of information may flow into each row of the array: feature map (FMAP) input elements and weight values. The weight values may flow into the array before the actual matrix multiply computation, and are stored in the processing engines (PEs) of the array. The FMAP data may flow in during the matrix multiply computation, and are multiplied in each PE by the previously stored weight value for that PE. The multiplication results are accumulated for each column of the array. Due to the architecture of the systolic array, the FMAP data for a particular computation are loaded into the systolic array as a diagonal wavefront in which the FMAP input elements are shifted into each row of the systolic array in a staggered manner. As such, when a buffer prepares the FMAP data for loading into the systolic array, each row of FMAP data may include unused data padding at the beginning and/or the end of the FMAP data to align the FMAP data diagonally.

The complexity of neural network models and the large amount of data that a neural network processes may require the FMAP data to be stored off-chip in system memory. This allows the buffer sizes in the accelerator chip to be manageable, but limits the systolic array to process a portion of the FMAP data at a time. In some instances, the FMAP data may be replicated across the different rows of the systolic array, and loading the FMAP data into the accelerator may involve multiple reads of the same data set from the system memory. Because of the staggered nature of inputting the FMAP data, the accelerator may also need to implement complicated shifting logic in the data buffers to rearrange the FMAP data to select the usable and unused padding data for shifting into the systolic array.

To facilitate the transfer of data from system memory to the accelerator, a direct memory access (DMA) engine with multicast capabilities can be implemented to reduce the number of reads to system memory in instances where the FMAP data is replicated across the different rows of the systolic array. Furthermore, to eliminate the need for complicated shifting logic, the DMA engine can write the usable FMAP data at specific offsets in the buffer memory of the accelerator. Because each byte of data read by the DMA engine has to be written out to prevent an error condition in the DMA engine, the unused padding data that is read together with the usable FMAP data also has to be written out. To reduce the number of write accesses to the accelerator, the unused padding data can be written back to the system memory. However, for system memory implemented with error correction logic, a write operation with unaligned data can result in a read-modify-write operation to recalculate the error correction code, which in turn limits the system memory throughput. Instead of writing the unused padding data back to system memory, the DMA engine can write the unused padding data to a null device address. The write operation to the null device address is subsequently dropped without actually writing the data. This allows the read and write data of the DMA engine to remain consistent while limiting the impact on system memory throughput. The multicast technique described herein can also be used to multicast weight data into the systolic array.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100. Computing system 100 includes a DMA engine 150, a system memory 120, and an accelerator 102. Computing system 100 may include other components not specifically shown, such as a host processor. Accelerator 102 can be a neural network accelerator (e.g., a neural network processor, tensor processing unit, etc.), and may include a processing engine array 110 (e.g., a systolic array), a state buffer 104, and a result buffer 112. Processing engine array 110 may include an array of processing engines arranged in rows and columns. Each processing engine is capable of performing a multiply-and-add operation. State buffer 104 is used to store input data such as feature map values and weight values for processing engine array 110. During operation, the input data are shifted into processing engine array 110 from state buffer 104 along the rows of the array. The computation results of the processing engines are accumulated along the column direction, and the column output data are stored in result buffer 112.

In most instances, tensors processed by processing engine array 110 may have thousands or even millions of elements. Because not all elements of a tensor can fit within accelerator 102 at the same time, system memory 120 can be used to store data that are not currently being processed in accelerator 102. As computations are carried out, data needed by accelerator 102 can be transferred from system memory 120 into accelerator 102, and data no longer needed by accelerator 102 can be transferred from accelerator 102 to system memory 120. System memory 120 can be implemented using one or more dynamic random access memory (DRAM) devices 122-1 to 122-n and/or other types of memories. In other implementations, system memory can be implemented, for example, with static random access memory (SRAM), flash memory, 3D cross-point memory, or any combination thereof.

Data transfers between system memory 120 and other components of computing system 100 may involve a host processor (not shown) to issue read and write commands to system memory 120. Such memory accesses through a host processor may incur unnecessary latency, especially when the host processor is not a consumer or generator of the data being accessed. To bypass the host processor, DMA engine 150 can be used to directly exchange data between system memory 120 and accelerator 102.

DMA engine 150 may include a DMA controller 170, a descriptor queue 160, an input interface 152, and an output interface 154. Descriptor queue 160 can be implemented as a circular buffer or ring queue, and is configured to store a set of memory descriptors that is used by DMA engine 150 to exchange data between system memory 120 and other components of computing system 100. For example, when accelerator 102 has data to store in system memory 120 or is requesting data from system memory 120, a memory descriptor providing a source address and a destination address can be placed in descriptor queue 160 to initiate the transfer. In some implementations, DMA engine 150 may include multiple descriptor queues. For example, DMA engine 150 may include a descriptor queue for writing data into system memory 120, and a descriptor queue for reading data from system memory 120. In some implementations, DMA engine 150 may implement multiple data transmission channels (e.g., different channels for different components of computing system 100), and each transmission channel may have its own descriptor queue or pair of descriptor queues for each transfer direction. Furthermore, DMA engine 150 can implement a destination descriptor queue that is used to facilitate multicast operations.

DMA controller 170 can be used to manage the operations of DMA engine 150. For example, DMA controller 170 can maintain head and tail pointers for descriptor queue 160 of DMA engine 150. DMA controller 170 can monitor the number of available entries in descriptor queue 160 to prevent queue overflow. In some implementations, DMA controller 170 can also maintain completion statuses and generates interrupts for component of computing system 100. DMA controller 170 may process the memory descriptors in descriptor queue 160 by reading data from the source designated in the memory descriptor via input interface 152, and writing the data to a target destination designated in the memory descriptor via output interface 154. As such, input interface 152 issues read operations to obtain the data being transferred, and output interface 154 issues write operations to place the data into the intended target. In some implementations, DMA controller 170 can also perform a multicast operation by reading a data set once, and writing that data set to multiple destinations. The multicast operation can reduce the number of repeated reads when the same data set is replicated in multiple destinations. The memory descriptor can be extended to include a multicast command such that DMA controller 170 can determine whether a particular transfer request is a regular data transfer operation or a multicast operation.

Figure 2:
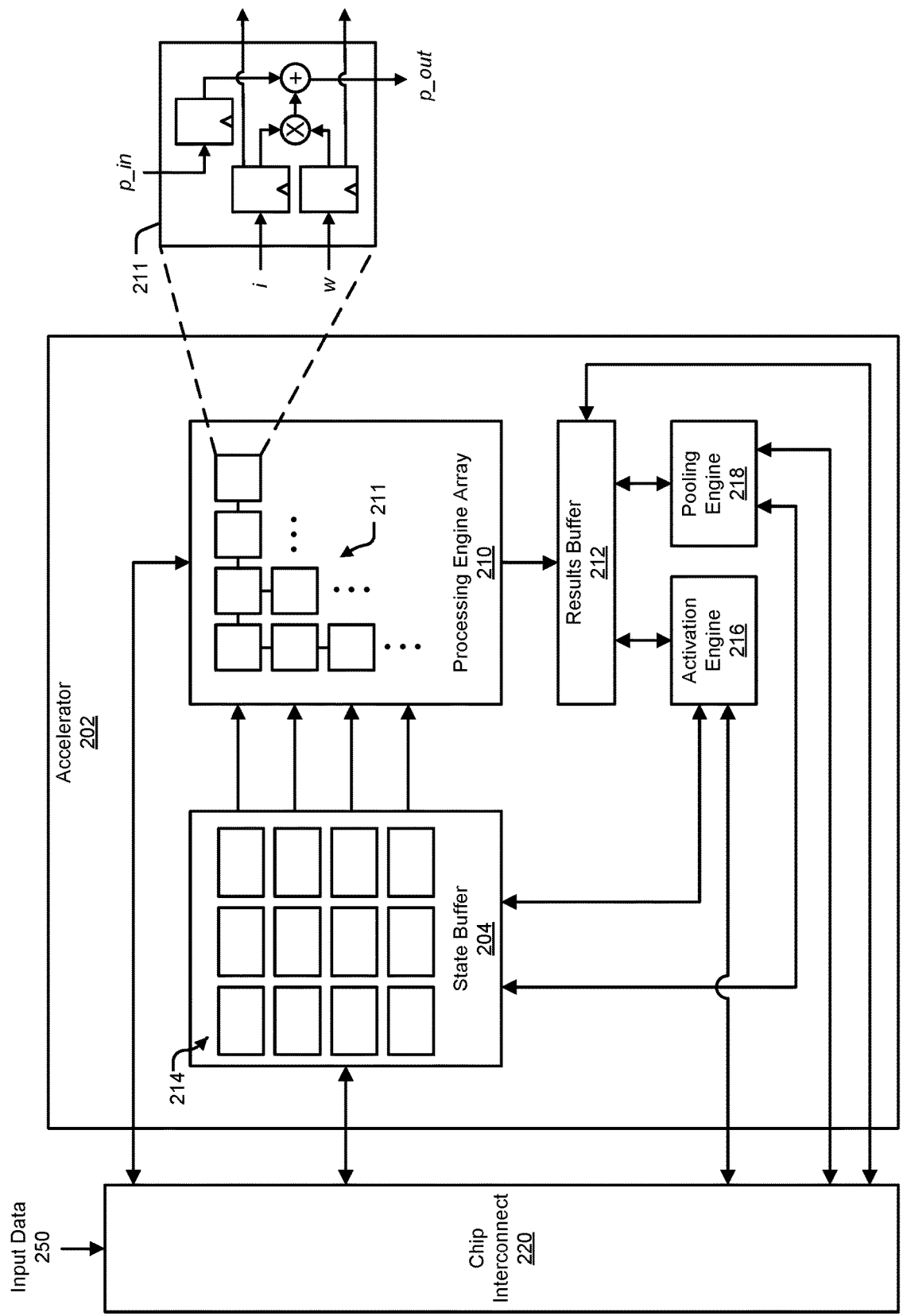
FIG. 2 illustrates a block diagram of an example of an integrated circuit device.

FIG. 2 is a block diagram illustrating an example of an integrated circuit device that includes an accelerator 202. In various examples, the accelerator 202, for a set of input data (e.g., input data 250), can execute computations using a processing engine array 210, an activation engine 216, and/or a pooling engine 218. In some examples, accelerator 202 may be an integrated circuit component of a processor, such as a neural network processor. The processor may have other integrated circuit components, including additional accelerator engines.

In various implementations, the state buffer 204 implemented as a memory subsystem can include multiple memory partitions 214. In these implementations, each memory partition 214 can be independently accessible, meaning that the read of one memory partition is not dependent on the read of another memory partition. Similarly, writing to one memory partition does not affect or limit writing to a different memory partition. In some cases, each memory partition can be read and written at the same time. Various techniques can be used to have independently accessible memory partitions 214. For example, each memory partition can be a physically separate memory component that has an address space that is separate and independent of the address spaces of each other memory partition. In this example, each memory partition may have at least one read channel and may have at least one separate write channel that can be used at the same time. In these examples, the state buffer 204 can permit simultaneous access to the read or write channels of multiple memory partitions. As another example, the state buffer 204 can include arbitration logic such that arbitration between, for example, the outputs of multiple memory partitions 214 can result in more than one memory partition's output being used. In these and other examples, though globally managed by the state buffer 204, each memory partition can be operated independently of any other.

Having the memory partitions 214 be independently accessible can increase the efficiency of the accelerator 202. For example, values can be simultaneously read and provided to each row of the processing engine array 210, so that the entire processing engine array 210 can be in use in one clock cycle. As another example, the memory partition 214 can be read at the same time that results computed by the processing engine array 210 are written to the memory subsystem. In contrast, a single memory may be able to service only one read or write at a time. With a single memory, multiple clock cycles can be required, for example, to read input data for each row of the processing engine array 210 before the processing engine array 210 can be started.

In various implementations, the state buffer 204 can be configured to simultaneously service multiple clients, including the processing engine array 210, the activation engine 216, the pooling engine 218, and any external clients that access the state buffer 204 over a communication fabric 220. In some implementations, being able to service multiple clients can mean that the state buffer 204 has at least as many memory partitions as there are clients. In some cases, each row of the processing engine array 210 can count as a separate client. As such, accelerator 202 may include at least one memory partition for each row of the processing engine array 210. In some cases, each column of the processing engine array 210 can output a result, such that each column can count as a separate write client. In some cases, output from the processing engine array 210 can be written into the memory partitions 214 that can then subsequently provide input data for the processing engine array 210. As another example, the activation engine 216 and the pooling engine 218 can include multiple execution channels, each of which can be separate memory clients. The memory partitions 214 can be implemented, for example, using static random access memory (SRAM).

In various implementations, the state buffer 204 can include control logic. The control logic can, for example, keep track of the address spaces of each of the memory partitions 214, identify memory partitions 214 to read from or write to, and/or move data between the memory partitions 214. In some implementations, memory partitions 214 can be hardwired to particular clients. For example, a set of memory partitions 214 can be hardwired to provide values to the rows of the processing engine array 210, with one memory partitions servicing each row. As another example, a set of memory partitions can be hard wired to receive values from columns of the processing engine array 210, with one memory bank receiving data for each column.

The processing engine array 210 is the computation matrix of the accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the state buffer 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 (may also be referred to as a processing element) is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, p_in, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory partitions 214 to be provided to the processing engine array 210 for additional computation. Alternatively, the results can be final results, which, once written to the memory partitions 214 can be read from the state buffer 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the state buffer 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include for example, computing a maximum value, a minimum value, an average value, a median value, a summation, a multiplication, or another logical or mathematical combination. In various examples, the pooling engine 218 can include multiple execution channels that can operating on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory partitions 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the state buffer 204, along with input data 250 on which the neural network will operate. The neural network can also include instructions, which can program the processing engine array 210 to perform various computations on the weights and the input data. The instructions can also be stored in the state buffer 204, in the memory partitions 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the state buffer 204 for inputting into the processing engine array 210 to compute results for the next layer of the neural network. The processing engine array 210 can further output final results from a last layer of the neural network. The final results can be stored in the state buffer 204 and then be copied out to host processor memory or to another location.

Figure 3A:
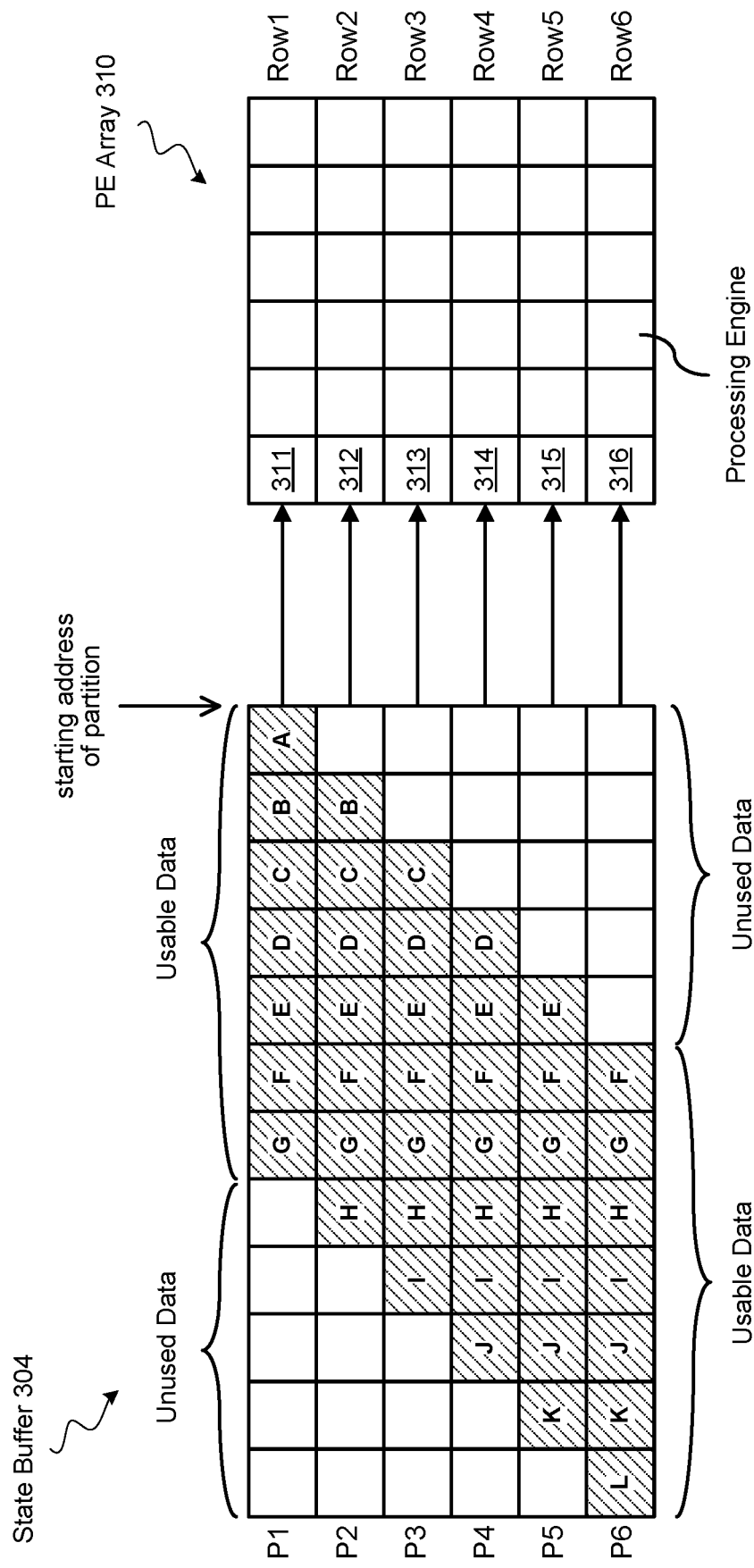
FIG. 3A illustrates an example of loading data into an array.

FIG. 3A illustrates a conceptual diagram of feature map data being loaded from a state buffer 304 into a processing engine array 310. Processing engine array 310 includes processing engines 311 arranged in rows and columns. Although the example of processing engine array 310 is shown as having six rows and six columns in FIG. 3A, it should be understood that processing engine array 310 may include any number of row and columns, and that the number of rows can be different than the number of columns. State buffer 304 includes memory partitions P1 to P6. Each partition can be allocated for a corresponding row in processing engine array 310. Accordingly, partition P1 can be used to store data for loading into Row1 of processing engine array 310; partition P2 can be used to store data for loading into Row2 of processing engine array 310; and so on.

As discussed above, when feature map data is loaded into processing engine array 310, the feature map input elements whose partial sums are accumulated together are loaded into respective rows of processing engine array 310 in a staggered manner. The feature map data is loaded in this manner because each processing engine takes one clock cycle to perform a multiply-and-accumulate operation to generate a partial sum for the next processing engine in the column. Taking the first column containing processing engines 311 to 316 as an example, the feature map input element (e.g., having a value A) for processing engine 311 is shifted into processing engine array 310 during the first clock cycle. It takes one clock cycle for processing engine 311 to perform a multiply-and-accumulate operation on the feature map input element to generate a partial sum output for processing engine 312. As such, the feature map input element (e.g., having a value B) for processing engine 312 (whose partial sum is being accumulated with the partial sum output of processing engine 311) is not shifted into processing engine 312 until the second clock cycle when the partial sum output from processing engine 311 becomes available to take part in the computation performed by processing engine 312.

The processing engines 313-316 in successive rows of the column operate in a similar manner. Accordingly, the feature map input element (e.g., having a value C) for processing engine 313 is shifted into processing engine array 310 at the third clock cycle; the feature map input element (e.g., having a value D) for processing engine 314 is shifted into processing engine array 310 at the fourth clock cycle; the feature map input element (e.g., having a value E) for processing engine 315 is shifted into processing engine array 310 at the fifth clock cycle; and the feature map input element (e.g., having a value F) for processing engine 316 is shifted into processing engine array 310 at the sixth clock cycle.

To prepare the feature map data for shifting into processing engine array 310, the feature map data can be stored in a staggered manner in state buffer 304. The feature map input elements used by processing engine array 310 for one pass of computations are shown as blocks with a hashed pattern marked as usable data. Data elements that do not participate in the computations are shown as unfilled blocks marked as unused data. Referring to partition P0 of state buffer 304, the feature map input elements used by Row1 of processing engine array 310 are stored starting at the beginning of partition P1, and unused filler data are stored at the tail end of partition P1. The feature map input elements used by Row2 of processing engine array 310 are stored at an offset from the beginning of partition P2, with unused data being stored at the beginning of partition P2. The offset can be equal to the length of a feature map input element. Thus, if the processing element operates on 32-bit floating-point feature map input elements, the offset from the beginning of partition P2 at which the usable data is stored can be 32-bits. The unused data stored at the tail end of partition P2 is shifted by the same offset. Similarly, the feature map input elements used by Row3 of processing engine array 310 are stored at twice the offset from the beginning of partition P3; the feature map input elements used by Row4 of processing engine array 310 are stored at three times the offset from the beginning of partition P4; the feature map input elements used by Row5 of processing engine array 310 are stored at four times the offset from the beginning of partition P5; and the feature map input elements used by Row6 of processing engine array 310 are stored at five times the offset from the beginning of partition P6.

In instances where the feature map data is placed into state buffer 304 from system memory, the usable feature map data for a partition can be stored together with the unused data for that partition in system memory. Placing the data into each partition of state buffer 304 may involve a direct memory access (DMA) transfer to read the data for a partition including both the usable data and unusable data, and write that data into the corresponding partition in state buffer 304. Thus, preparing the data for each partition of state buffer 304 for loading into processing engine array 310 may require a separate read access to system memory. In some instances, the feature map data may be replicated for each row of processing engine array 310, and placing the data in state buffer 304 may involve repeatedly reading the same data from system memory. To reduce the number of reads to system memory, a DMA engine with multicast capabilities can be implemented to facilitate the data transfers between system memory and state buffer 304.

Figure 3B:
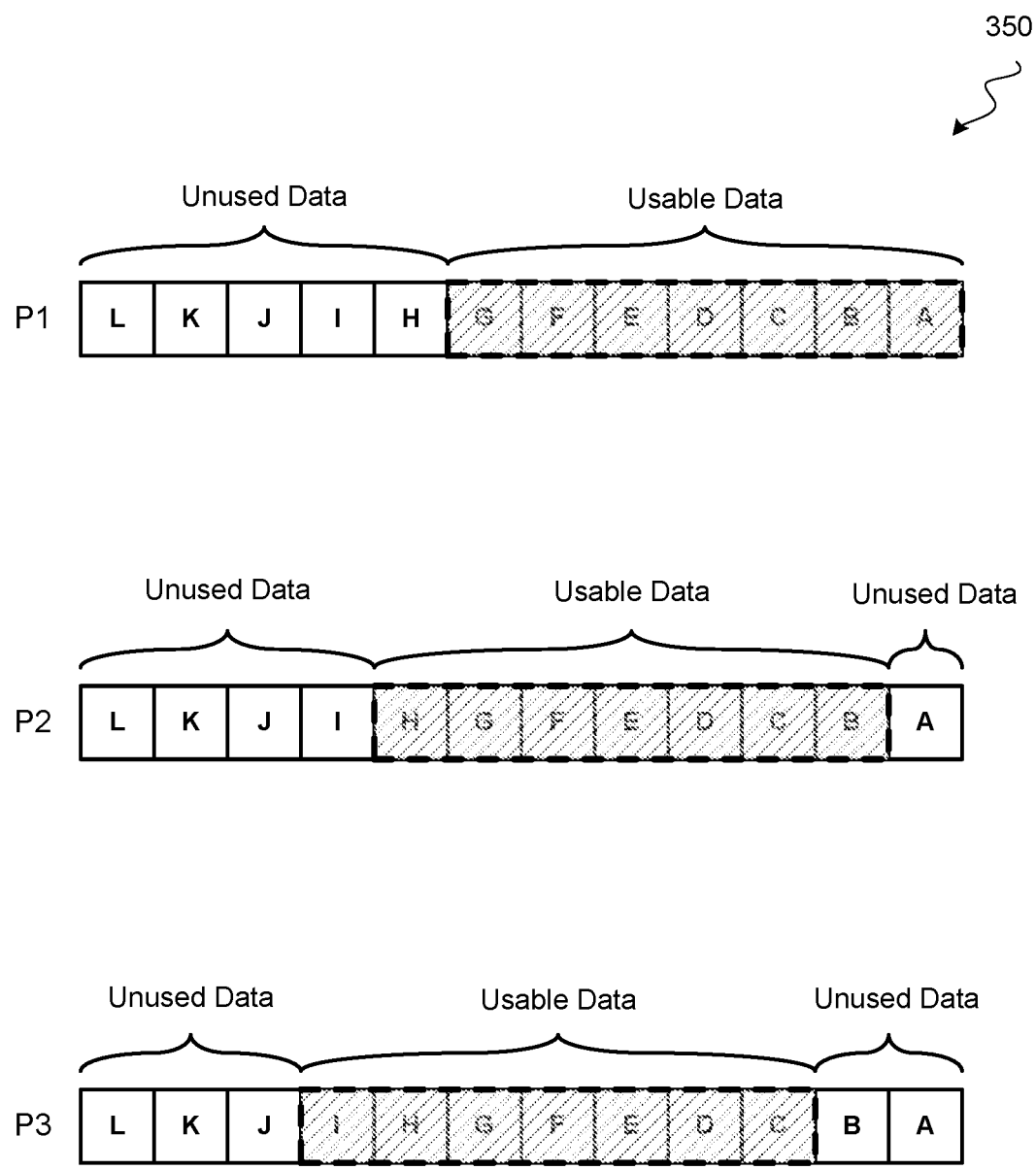
FIG. 3B illustrates an example of usable and unused data for different rows of an array.

FIG. 3B illustrates examples of usable and unused data for different partitions. Diagram 350 shows the first three partitions P1, P2, and P3 of state buffer 304. As FIG. 3B illustrates, each partition is operating with the same set of data elements A through L, but the usable portion of the data elements is shifted for each successive partition. For example, the usable data for partition P1 is elements A through G; the usable data for partition P2 is elements B through H; and the usable data for partition P3 is elements C through I. Similarly, the unused data is shifted accordingly for each successive partition.

Instead of repeatedly reading the same set of data elements A through L from system memory, a DMA engine with multicast capabilities can read the set of data elements A through L once and store it as multicast data in a local multicast buffer. The DMA engine can generate multiple write operations to cycle through the multicast data in the multicast buffer to write to the different partitions. Hence, the multicast buffer may operate as a circular buffer as the multicast data stored therein is read. In FIG. 3B, the DMA engine can repeatedly write seven usable data elements to successive partitions and write six unused elements elsewhere. This can be performed repeatedly to replicate the multicast data in the multicast buffer to the different partitions.

By way of example, the DMA engine can write the first seven elements A though G in the multicast buffer to partition P1, and write the next six elements elsewhere. These next six elements would include elements H through L to reach the end of the multicast data in the multicast buffer and then restart at the beginning of the multicast data to include element A. The DMA engine can then write the next seven elements B through H to partition P2, and write the next six elements elsewhere I through L and A through B elsewhere. Similarly, the DMA engine can then write the next seven elements C through I to partition P3, and write the next six elements elsewhere, and so on. To facilitate this process, the unused data can be written to a null device address.

Figure 4:
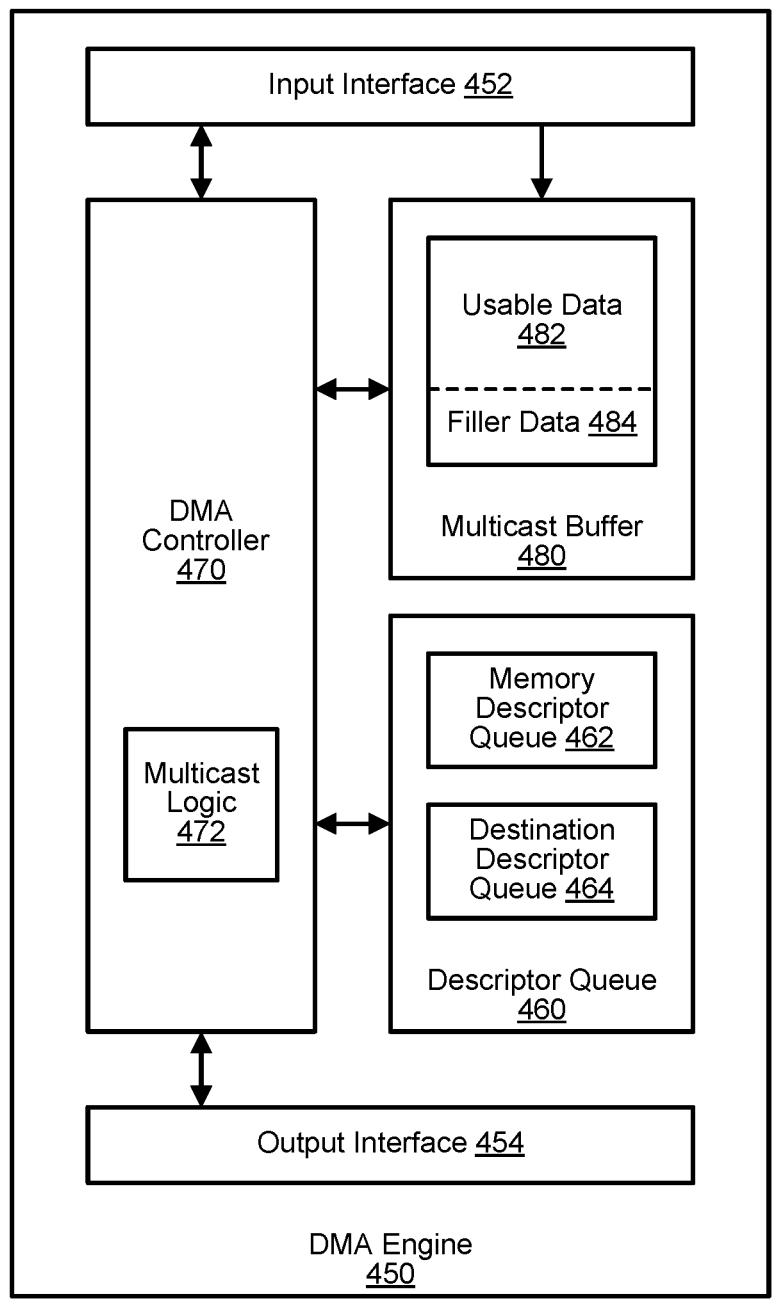
FIG. 4 illustrates a block diagram of an example of a direct memory access engine.

FIG. 4 illustrates a more detailed block diagram of an example of a DMA engine 450 with multicast capabilities. DMA engine 450 can be similar to DMA engine 150, and may include an input interface 452, an output interface 454, a descriptor queue 460, and a DMA controller 470. To facilitate multicast operations, DMA engine 450 may include a multicast buffer 480 configured to store multicast data from input interface 452 that is being written to multiple target destinations. DMA controller 470 may also include multicast logic 472 that is used to generate write operations for the multicast request. In some implementations, the multicast write operations can be implemented using destination descriptors to provide destination information (e.g., destination addresses) for the multiple target locations. As such, in addition to a memory descriptor queue 462 to store memory descriptors of data transfer requests, descriptor queue 460 may also implement a destination descriptor queue 464 that is used for writing the multicast data stored in multicast buffer 480 to multiple destinations.

During operation, DMA controller 470 may receive a data transfer request in the form of a memory descriptor placed in memory descriptor queue 462. The memory descriptor may include a source address, a pointer pointing to a set of destination descriptors, and a data length indicating the amount of data to transfer. Input interface 452 can be used to read the data stored at the location of the source address specified in the memory descriptor. Output interface 454 can be used to write the data read from the source address to a target at the location of the destination addresses specified in the destination descriptors. The data transfer request (e.g., the memory descriptor) may include a multicast indicator to indicate that the data transfer request is a multicast request. The multicast indicator can be, for example, a multicast bit or multicast flag. In some implementations, if the memory descriptor format includes control bits to implemented commands for the DMA controller 470, the multicast indicator can be implements as a multicast command encoded in the control bits. The memory descriptor may also include a replication number indicating the number of times to cycle through the multicast buffer. In some instances, the multicast request can be used to replicate data for placement into a target memory that is organized into multiple partitions. For example, in the context of placing feature map data from system memory into a state buffer in preparation for loading into a systolic array, the multicast request can be used to replicate the feature map data for some or all of the rows of the systolic array. In such instances, the replication number may correspond to the number of partitions to write.

When a transfer request is determined to be a multicast request as indicated by the multicast indicator, the data read from the source address (e.g., system memory) via input interface 452 can be stored as multicast data in multicast buffer 480. As discussed above, the data for placement into each partition of the state buffer may include usable feature map data as well as unused data (may also be referred to as filler data). As such, the multicast data stored in multicast buffer 480 may include usable data 482 that is actually consumed by the target (e.g., feature map data), as well as filler data 484 that is not used. As explained in FIG. 3B, the usable data 482 and the filler data 484 are selected from the same multicast data, but the portion of the multicast data that is usable and unused are shifted for each successive partition.

The multicast logic 472 in DMA controller 470 can use the destination addresses provided by the destination descriptors, and generate a set of write operations with different destination addresses for the output interface 454. For example, the set of write operations may include, for each partition of a target memory. a write operation to write the usable data (e.g., feature map data) stored in the multicast buffer 480 to an address offset in the corresponding partition. The address offset increases for each successive partition of the target memory. In some implementations, the destination descriptors are placed in destination descriptor queue 464, and multicast logic 472 can process the destination descriptors from destination descriptor queue 464 by writing the multicast data to the destinations specified in the destination descriptors via output interface 454.

In some implementations, instead of relying on destination descriptors being given to DMA engine 450, DMA engine 450 may generate its own set of destination descriptors based on a starting destination address. In order for multicast logic 472 to generate the multiple destination addresses, DMA controller 470 can be provided with a partition size of the target memory as well as an offset increment value for incrementing the address offset for each successive partition. In some implementations, the partition size and offset increment information can be included as part of the data transfer request (e.g., be included as part of the memory descriptor). In some implementations, the partition size and offset increment information can be configured in multicast logic 472 when the DMA channel for transferring data to the target memory is established.

As mentioned above, to prevent an error condition from occurring in DMA engine 450, every byte of data read by DMA engine 450 has to be written out to a target location. This requirement also applies to the filler data being read from system memory together with the usable data. Because the fille data is not consumed by the target device, it is not necessary to actually write the filler data into the target memory. As such, instead of issuing actual write operations to the target memory, multicast logic 472 can generate, for each partition of the target memory, one or more write operations to write the filler data not used by a partition to a null device address.

The null device address can be memory-mapped in the computing system implementing DMA engine 450, such that the computing system generates a response to the DMA engine 450 indicating the write operation to the null device address is complete. The null device address can be memory-mapped to an otherwise unused address (e.g., an address outside the address range of system memory), and the computing system is configured to drop the write operation to the null device address such that no actual data is written. This allows DMA engine 450 to function properly while reducing the number of actual write accesses to the components of the computing system. The response to the write operation to the null device address can be handled by a memory management component of the computing system such as a memory management unit of an operating system, a hypervisor, etc.

Figure 5A:
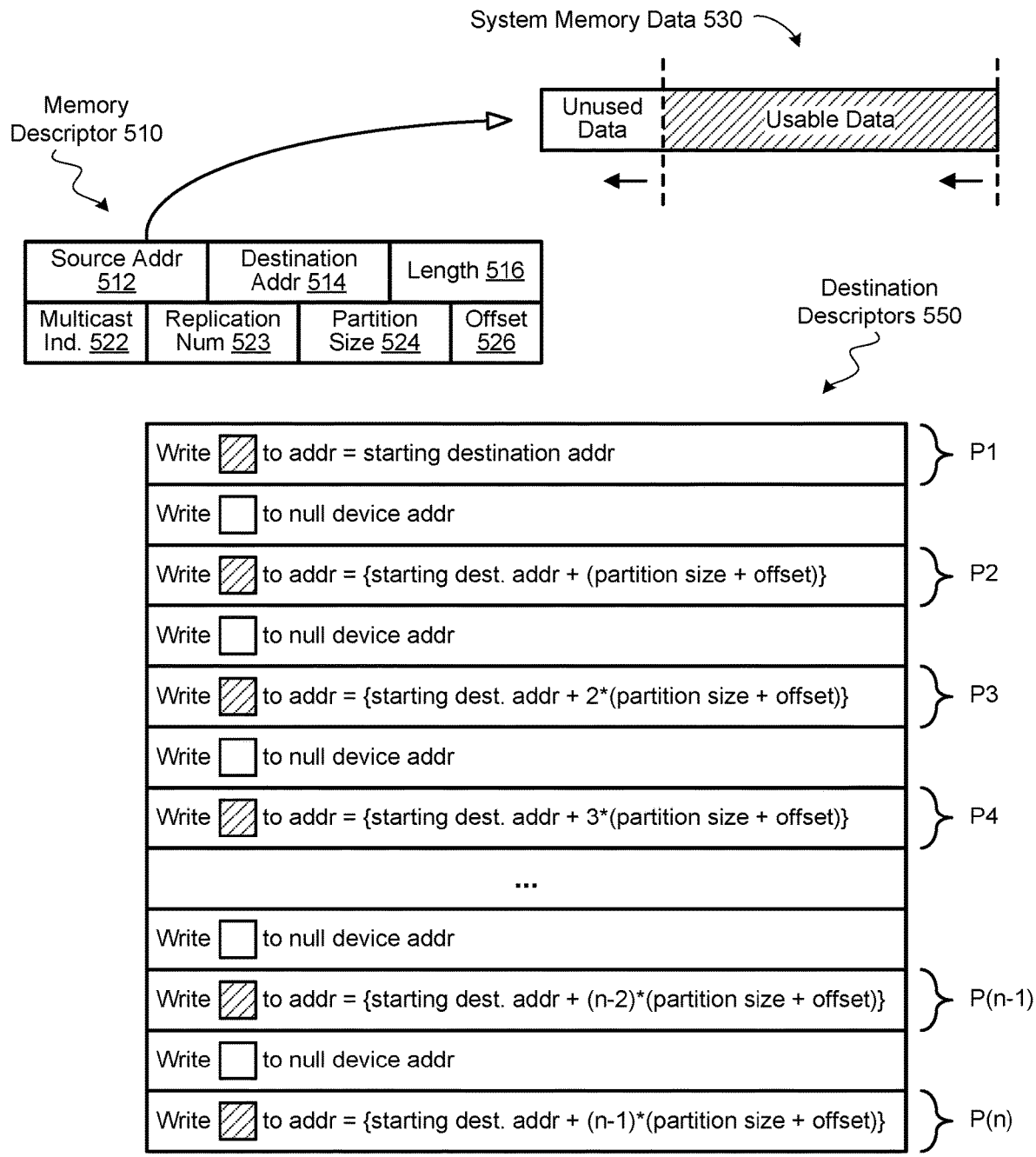
FIG. 5A illustrates an example of a multicast request.

FIG. 5A illustrates an example of a multicast request being processed by a DMA engine such as DMA engine 450. In the example of FIG. 5A, the DMA engine may generate its own destination descriptors for a multicast operation. The multicast request shown in FIG. 5A can be, for example, a request to transfer data from system memory to the state buffer of an accelerator in preparation for loading into a systolic array. The state buffer may include a partition for each row of the systolic array, and the multicast request can be used to replicate the feature map data with the appropriate offset for loading into each row of the systolic array.

To initiate the multicast request, a memory descriptor 510 is placed into the memory descriptor queue of the DMA engine. For example, a data scheduler responsible for scheduling data movement in the computing device can place memory descriptor 510 into the memory descriptor queue when the feature map data is expected to be processed by the accelerator. Memory descriptor 510 may include a source address 512, a destination address 514, and a data length 516. In addition, memory descriptor 510 may also include a multicast indicator 522 to indicate that the data transfer request is a multicast request, a replication number 523 to indicate the number of times to cycle through the multicast data (which may correspond to the number of partitions to write), a partition size 524 of the partitions in the target memory (e.g., state buffer of the accelerator), and/or an offset value 526 indicating the incremental offset for each successive partition. For example, source address 512 may point to a location in system memory where the feature map data is stored, and destination address 514 may point to the starting address of the partition of a state buffer allocated for the first row of a systolic array. Partition size 524 may indicate the partition size of the state buffer, and the offset value 526 may represent the length of the datatype of a feature map element (e.g., 32-bits for 32-bit floating-point feature map values).

Upon determining, based on the multicast indicator 522, that the transfer request associated with memory descriptor 510 is a multicast request (e.g., to multicast feature map data to the systolic array), the DMA engine may retrieve the system memory data 530 being multicasted and store that data in the multicast buffer of the DMA engine. As shown in the FIG. 5A, the system memory data 530 being multicasted may include both usable data (e.g., feature map data), as well as unused or filler data, and the portion of usable and unused data can be shifted for each successive partition. The multicast logic of the DMA engine may then generate a set of destination descriptors 550 for placement into a destination descriptor queue. For example, the set of destination descriptors 550 may include, for each of multiple rows of the systolic array of the accelerator, a destination descriptor to write the feature map data stored in the multicast buffer to a row-dependent address offset in the partition of the state buffer allocated for the corresponding row of the systolic array, and an additional destination descriptor to write the unused or filler data from the multicast buffer to a null device address.

Referring to FIG. 5A, the set of destination descriptors 550 may include a first set of destination descriptors for the first partition P1 of the state buffer. This first set of destination descriptors may include a destination descriptor to write the usable data to the starting destination address 514 as indicated in the memory descriptor, and an additional destination descriptor to write the unusable or filler data to the null device address. The set of destination descriptors 550 may include a second set of destination descriptors for the second partition P2 of the state buffer. This second set of destination descriptors may include a destination descriptor to write the usable data to a destination address determined by adding the sum of the partition size 524 and the offset value 526 to the starting destination address 514. This destination address corresponds to a location at one times the offset from the beginning of the second partition P2. The second set of destination descriptors for the second partition P2 may also include an additional destination descriptor to write the unused or filler data to the null device address.

The set of destination descriptors 550 may include a third set of destination descriptors for the third partition P3 of the state buffer. This third set of destination descriptors may include a destination descriptor to write the usable data to a destination address determined by adding two times the sum of the partition size 524 and the offset value 526 to the starting destination address 514. This destination address corresponds to a location at two times the offset from the beginning of the third partition P3. The third set of destination descriptors for the third partition P3 may also include an additional destination descriptor to write the unused or filler data to the null device address.

The destination addresses to write the usable data for the destination descriptors of the remaining partitions can be determined in a similar manner. For example, the destination descriptors for partition P(n−1) may include a destination descriptor to write the usable data to a destination address determined by adding (n−2) times the sum of the partition size 524 and the offset value 526 to the starting destination address 514. This destination address corresponds to a location at (n−2) times the offset from the beginning of partition P(n−1). The destination descriptors for partition P(n−1) may also include an additional destination descriptor to write the unused or filler data to the null device address.

At partition P(n), the amount of offset at the beginning of the partition and the amount of feature map data being written into the partition may span the full size of the partition. As such, the destination descriptors for partition P(n) may include a destination descriptor to write the usable data to a destination address determined by adding (n−1) times the sum of the partition size 524 and the offset value 526 to the starting destination address 514. This destination address corresponds to a location at (n−1) times the offset from the beginning of partition P(n). It should be noted that the last partition P(n) does not have an additional destination descriptor to write the unused or filler data to the null device address. As such, the last partition P(n) may have only one destination descriptor associated with it to write the usable data.

Figure 5B:
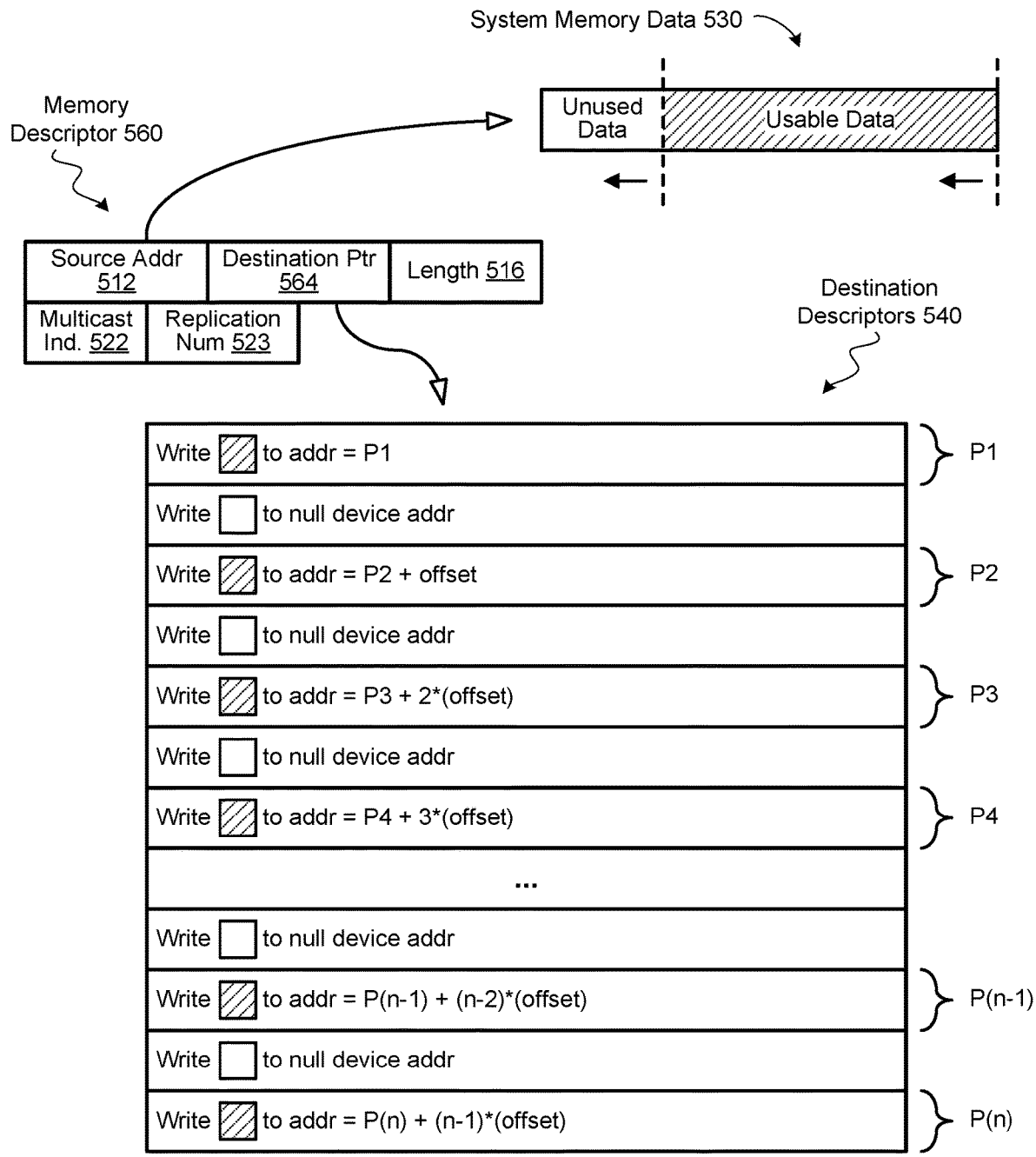
FIG. 5B illustrates another example of a multicast request.

FIG. 5B illustrates another example of a multicast request being processed by a DMA engine such as DMA engine 450. In the example of FIG. 5B, the DMA engine is provided with a set of destination descriptors 540. As such, it is not necessary for the DMA engine to generate its own destination descriptors, and any logic needed to do so can be omitted. Because the DMA engine does not generate its own destination descriptors, the partition size and offset value can be omitted from memory descriptor 560. Furthermore, instead of a starting destination address, memory descriptor 560 may include a destination descriptor pointer 564 that points to a data structure such as a linked-list containing the destination descriptors 540 used for the multicast operation. The contents of the destination descriptors 540 are similar to FIG. 5A, and hence a detailed description of which need not be repeated.

Figure 6:
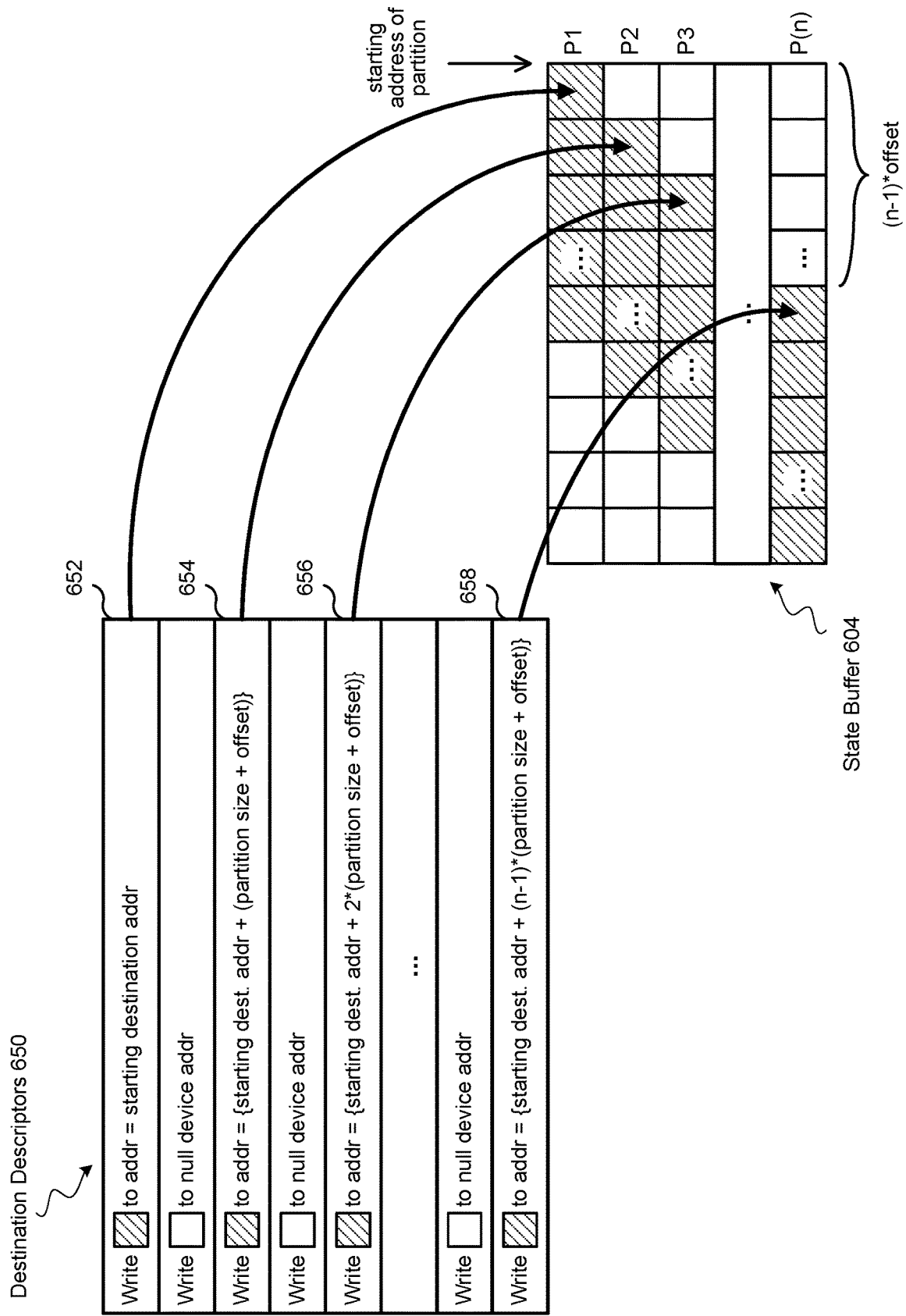
FIG. 6 illustrates an example of writing data into a target memory using destination descriptors.

FIG. 6 illustrates an example of multicasting data to a state buffer 604 using destination descriptors 650. The set of destination descriptors 650 can be similar to the destination descriptors 550 described above. The set of destination descriptors 650 may include a destination descriptor 652 to write the usable data to a starting destination address as indicated in the memory descriptor of the transfer request. This starting destination address may point to the beginning of the fist partition P1 of state buffer 604. As such, the usable data is written at the beginning of the first partition P1. The set of destination descriptors 650 may include a destination descriptor 654 to write the usable data to a destination address determined by adding the sum of the partition size and the offset value to the starting destination address. This destination address corresponds to a location at one times the offset from the beginning of the second partition P2 of state buffer 604. As such, the usable data is written at one offset from the beginning of the second partition P2.

Similarly, the set of destination descriptors 650 may include a destination descriptor 656 to write the usable data to a destination address determined by adding two times the sum of the partition size and the offset value to the starting destination address. This destination address corresponds to a location at two times the offset from the beginning of the third partition P3 of state buffer 604. As such, the usable data is written at two offsets from the beginning of the third partition P3. The set of destination descriptors 650 may include a destination descriptor 658 to write the usable data to a destination address determined by adding (n−1) times the sum of the partition size and the offset value to the starting destination address. This destination address corresponds to a location at (n−1) times the offset from the beginning of partition P(n) of state buffer 604. As such, the usable data is written at (n−1) offsets from the beginning of the partition P(n).

The set of destination descriptors 650 also includes a number of destination descriptors to write the unused or filler data (or a portion thereof) to a null device address. Because these destination descriptors are pointing to a memory location that is not mapped to the state buffer 604, the write operations corresponding to these destination descriptors do not reach the state buffer 604. Thus, the number of write accesses to state buffer 604 can be reduced. These write operations to the null device address are dropped or discarded by the computing system, but a proper response is still generated for the DMA engine to prevent the DMA engine from triggering an error interrupt.

Figure 7:
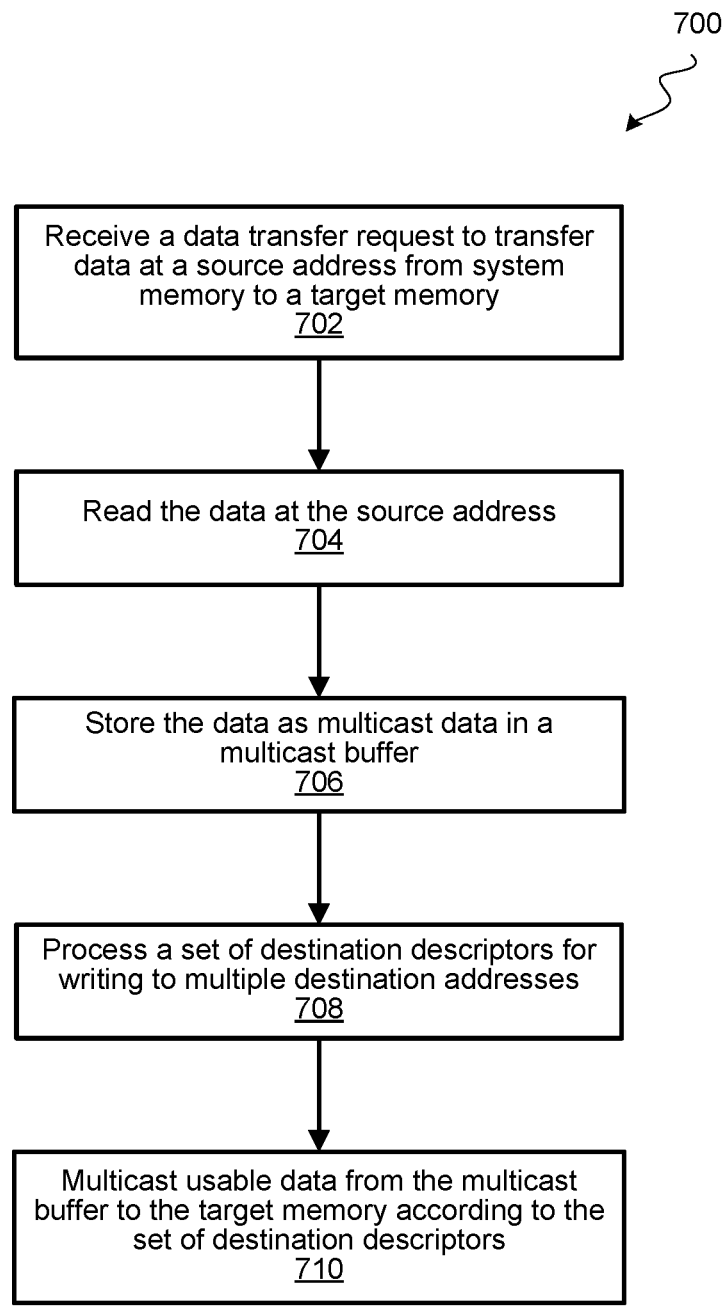
FIG. 7 illustrates a flow diagram of an example of a process for multicasting data.

FIG. 7 illustrates a flow diagram of a process 700 that can be used to transfer data from system memory to a target memory. Process 700 can be performed, for example, by a DMA engine that is communicatively coupled between system memory and an accelerator that the target memory is part of. The DMA engine may include multicast logic to generate destination descriptors to enable an output interface to perform multicast write operations according to the destination descriptors.

Process 700 may begin at block 702 by receiving a data transfer request to transfer data at a source address from system memory to a target memory. The target memory can be a storage area that is used for preparing data for loading into an array. For example, the target memory can be a state buffer that is used to prepare feature map data or weight data for loading into a systolic array. The target memory may include at least one partition allocated for each row of the array. In some implementations, the data transfer request can be in the form of a memory descriptor for placement into a descriptor queue of a DMA engine. The memory descriptor may include a source address, a destination address or a pointer to destination descriptors, and a data length indicating the size of the data that should be read and transferred. To reduce the number of repeated reads of the same data being replicated to the target memory, the data transfer request may include a multicast indicator to indicate that the data transfer request is a multicast request, as well as a replication number to indicate the number of times the multicast data is written.

At block 704, the data at the source address is read. The amount of data to read at the source address can be specified, for example, by a data length field in the data transfer request or memory descriptor. In some implementations, the data being read may include, for a particular partition, usable data such as feature map data or weight data that participates in the computation perform by an accelerator, as well as unused or filler data that are not used for computations for that partition. For a multicast request, the usable data from the multicast data for each particular partition can be replicated to the corresponding partition of the target memory for loading into each row of the array. At block 706, the data read from the source address is stored as multicast data in a multicast buffer if the data transfer request is determined to be a multicast request.

At block 708, a set of destination descriptors is processed to implement the multicast operation. The set of destination descriptors can be provided to the DMA engine, for example, by a data scheduler, or can be generated by the DMA engine. The set of destination descriptors may include a destination descriptor for each of multiple rows of the array to write the usable data stored in the multicast buffer for the corresponding row to a row-dependent address offset in a corresponding partition of the target memory. The set of destination descriptors may also include an additional destination descriptor for each of multiple rows of the array to write the unused or filler data from the multicast buffer to a null device address. The last row of the array may only have one destination descriptor to write the usable data, and may not have the additional destination descriptor for the unused or filler data. As such, for n partitions, there can be 2n−1 destination descriptors (including usable and unused data) to process.

The null device address is memory-mapped to an address in the computing system, but the computing system is configured to drop or discard any write operation to the null device address while still generating a proper response. For example, when the DMA engine processes the addition destination descriptors for the unused or filler data, the DMA engine may issue a write operation to write the unused or filler data to the null device address. Although the unused or filler data is not actually written to any location, the DMA engine may still receive a response from the computing system indicating the write operation is complete. This is done to prevent the DMA engine from triggering an error condition due to a mismatch between the number of bytes read and the number of bytes written.

At block 710, process 700 may multicast the usable data from the multicast buffer to the target memory according to the set of destination descriptors generate from block 708. For example, the DMA engine may issue a write operation for each destination descriptor to write the usable data at the row-dependent offset in a corresponding partition at the row-dependent offset. In this manner, usable data such as feature map data or weight data can be replicated from the multicast buffer across the different rows of the array without unnecessary accesses to the system memory and/or to the accelerator.

Figure 8:
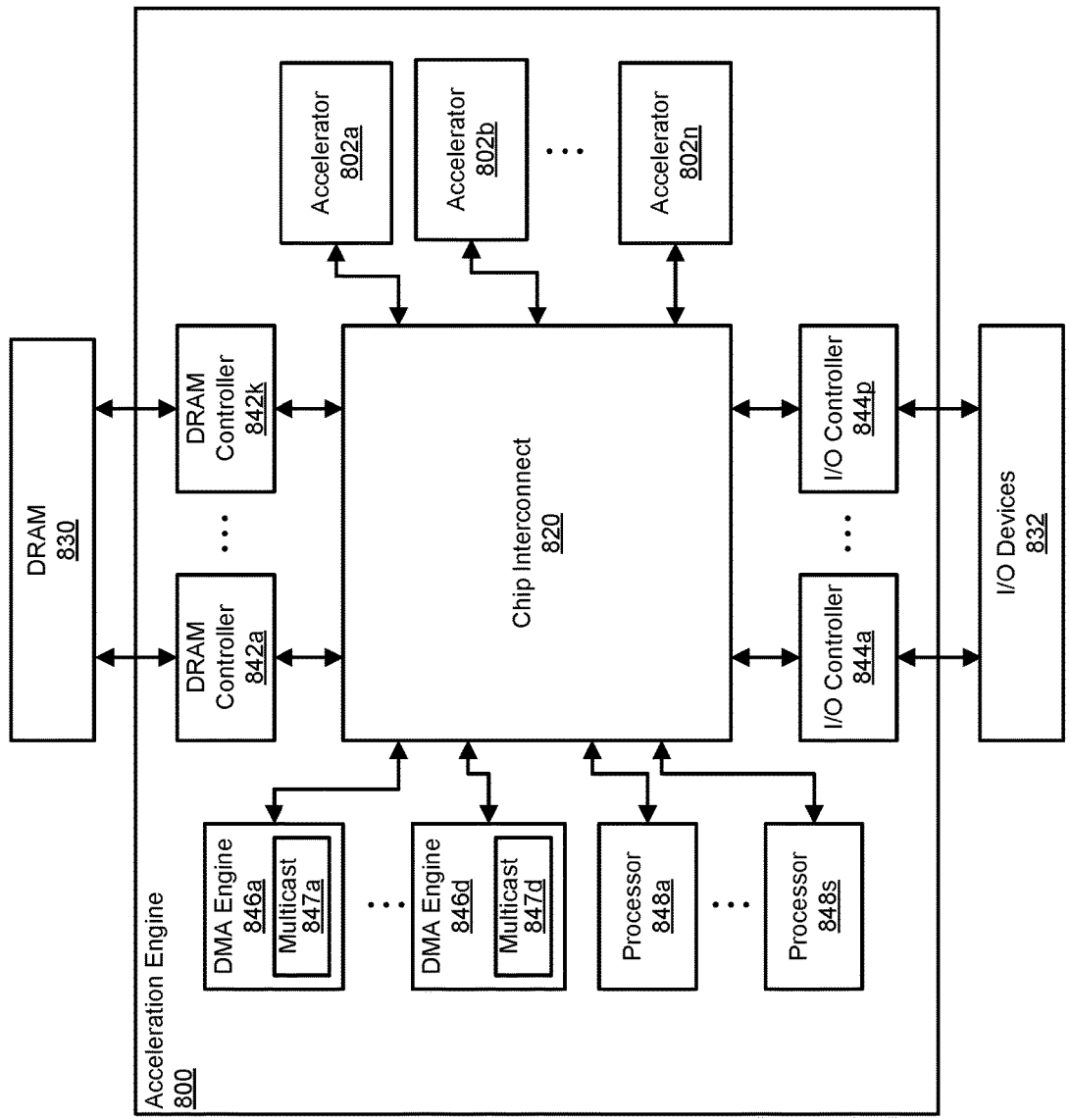
FIG. 8 illustrates a block diagram of an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 2.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general-purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the is a graphics accelerator) or can be different (e.g., the accelerators 802a-802n include a graphics accelerator, a floating-point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. DMA engines 846a-846d can be similar to the DMA engine shown in FIG. 4, and each may include respective multicast logic 847a-847d. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
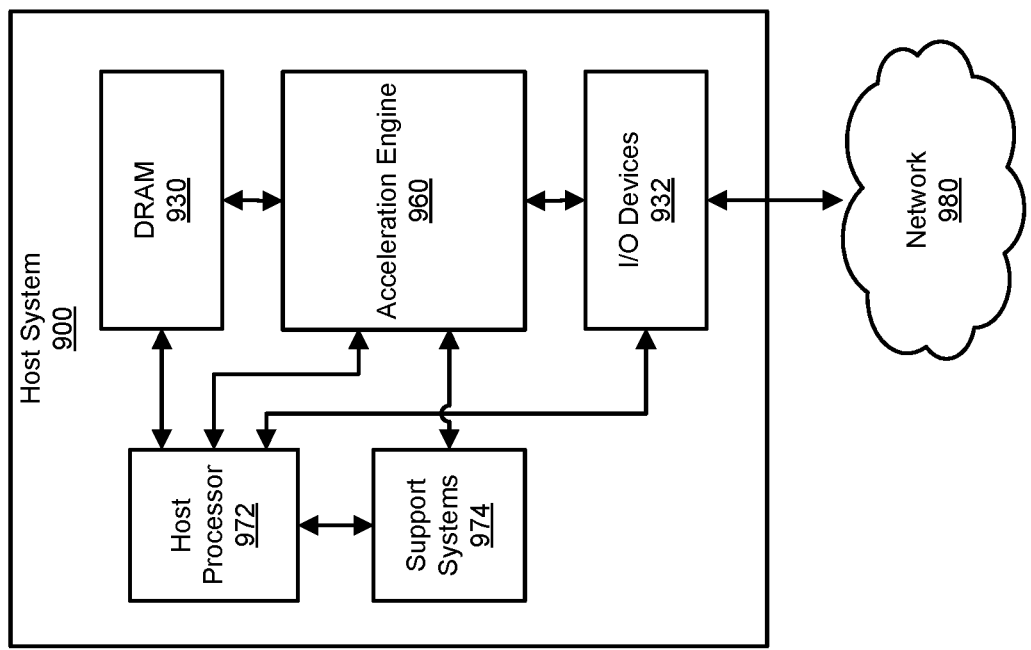
FIG. 9 illustrates a block diagram of an example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   system memory;
   a neural network accelerator including a systolic array and a state buffer configured to store data for loading into the systolic array, wherein the state buffer includes a partition for each row of the systolic array; and
   a direct memory access (DMA) engine configured to transfer data from the system memory to the state buffer, the DMA engine including:
      an input interface configured to perform read operations according to a source descriptor;
      a multicast buffer configured to store multicast data read from the system memory via the input interface;
      a controller configured to:
         determine that a transfer request is for multicasting data to the systolic array; and
         process a set of destination descriptors, the set of destination descriptors including, for each of a plurality of rows of the systolic array:
            a destination descriptor to write usable data stored in the multicast buffer to a row-dependent address offset in the partition of the state buffer allocated for the corresponding row of the systolic array; and
            an additional destination descriptor to write unused data from the multicast buffer to a null device address; and
      an output interface configured to perform multicast write operations according to the set of destination descriptors.

2. The computing system of claim 1, wherein the computing system is configured to discard a write operation to the null device address, and generate a response to the DMA engine indicating that the write operation to the null device address is complete.

3. The computing system of claim 1, wherein the set of destination descriptors includes, for a last row of the systolic array, one destination descriptor to write usable data for the last row from the multicast buffer to a last partition of the state buffer.

4. The computing system of claim 1, wherein the row-dependent address offset increases by a length of a datatype of a feature map element for each successive row of the systolic array.

5. A direct memory access engine comprising:
   an input interface configured to read data;
   an output interface configured to write data to a target memory organized as partitions;
   a multicast buffer configured to store multicast data from the input interface; and
   a controller configured to:
      receive a data transfer request; and
      generate a set of write operations for the output interface, the set of write operations including, for each of a plurality of the partitions of the target memory:
         a write operation to write usable data stored in the multicast buffer to an address offset in the corresponding partition, wherein the address offset increases for each successive partition; and
         an additional write operation to write filler data stored in the multicast buffer to a null device address.

6. The direct memory access engine of claim 5, wherein the data transfer request includes a multicast indicator indicating the data transfer request is a multicast request.

7. The direct memory access engine of claim 5, wherein the data transfer request includes a source address and a data length that are used to read the multicast data stored in system memory.

8. The direct memory access engine of claim 5, wherein the data transfer request includes a pointer pointing to a set of destination descriptors.

9. The direct memory access engine of claim 5, wherein the data transfer request further includes a replication number indicating a number of partitions to write.

10. The direct memory access engine of claim 5, wherein the set of write operations includes, for a last partition of the target memory, one write operation to write usable data for the last partition from the multicast buffer to the last partition of the target memory.

11. The direct memory access engine of claim 5, wherein the set of write operations are generated according to a set of destination descriptors.

12. The direct memory access engine of claim 5, wherein the usable data is feature map data or weight data for a neural network.

13. The direct memory access engine of claim 5, wherein the target memory is a state buffer of a neural network accelerator.

14. The direct memory access engine of claim 13, wherein the neural network accelerator includes a systolic array, and each partition of the target memory corresponds to a row of the systolic array.

15. The direct memory access engine of claim 5, wherein the null device address is memory-mapped in a computing system, and wherein the computing system is configured to drop the write operation to the null device address and generate a response to the direct memory access engine indicating the write operation to the null device address is complete.

16. A computer-implemented method comprising:

receiving, by a direct memory access (DMA) engine, a data transfer request to transfer data at a source address from system memory to a target memory for loading into an array;

reading, by the DMA engine, the data at the source address;

storing, by the DMA engine, the data as multicast data in a multicast buffer;

processing, by the DMA engine, a set of destination descriptors, the set of destination descriptors including, for each of a plurality of rows of the array:

a destination descriptor to write usable data stored in the multicast buffer to a row-dependent address offset in a corresponding partition of the target memory; and an additional destination descriptor to write filler data stored in the multicast buffer to a null device address; and multicasting, by the DMA engine, the usable data for each row of the array from the multicast buffer to the target memory according to the set of destination descriptors.

17. The computer-implemented method of claim 16, wherein the null device address is memory-mapped to an address in a computing system that is outside an address range of the system memory.

18. The computer-implemented method of claim 17, further comprising:

issuing a write operation to write the filler data to the null device address; and receiving a response from the computing system indicating the write operation is complete.

19. The computer-implemented method of claim 16, wherein the usable data corresponds to feature map data or weight data for a neural network.

20. The computer-implemented method of claim 16, wherein the array is a systolic array.

* * * * *